United States Patent [19]

Aldrich

[11] Patent Number: 4,608,103

[45] Date of Patent: Aug. 26, 1986

[54] PRODUCTION OF FOAM CORE INSULATING PANELS

[75] Inventor: Donald F. Aldrich, Dayton, Ohio

[73] Assignee: Deraspan Corporation, Dayton, Ohio

[21] Appl. No.: 734,866

[22] Filed: May 16, 1985

[51] Int. Cl.$^4$ ............................................. B29C 27/06
[52] U.S. Cl. ................................... 156/64; 156/308.2; 156/309.9; 156/324; 156/359; 156/499
[58] Field of Search .................... 156/64, 304.6, 308.2, 156/309.9, 324, 359, 499

[56] References Cited

U.S. PATENT DOCUMENTS

| | | | |
|---|---|---|---|
| 2,438,685 | 3/1948 | Stevens. | |
| 3,282,766 | 11/1966 | Wright | 156/499 |
| 3,879,254 | 4/1975 | Hay, II | 156/461 |
| 4,158,711 | 6/1979 | Gould | 156/308.2 X |
| 4,175,998 | 11/1979 | Hay et al. | 156/499 X |
| 4,533,423 | 8/1985 | Johnson et al. | 156/359 |

Primary Examiner—Robert A. Dawson
Attorney, Agent, or Firm—Jacox & Meckstroth

[57] ABSTRACT

Two rectangular rigid foam boards are supported horizontally above and below an elongated horizontal heating blade which extends laterally across the width of the boards. The heating blade is supported for vertical floating movement for uniformly heating and softening the opposing side surfaces of the boards while the boards are fed between horizontal driven pressure rolls. The rolls cooperate with the blade to heat-fuse or weld the boards together and form a laminated foam core assembly. The foam core assembly is planed to a precision thickness and then bonded by adhesive to facing sheets of preselected materials. The temperature of the blade is sensed and controlled according to the speed of the pressure rolls and the pressure applied by the rolls during the heat-fusing operation.

9 Claims, 5 Drawing Figures

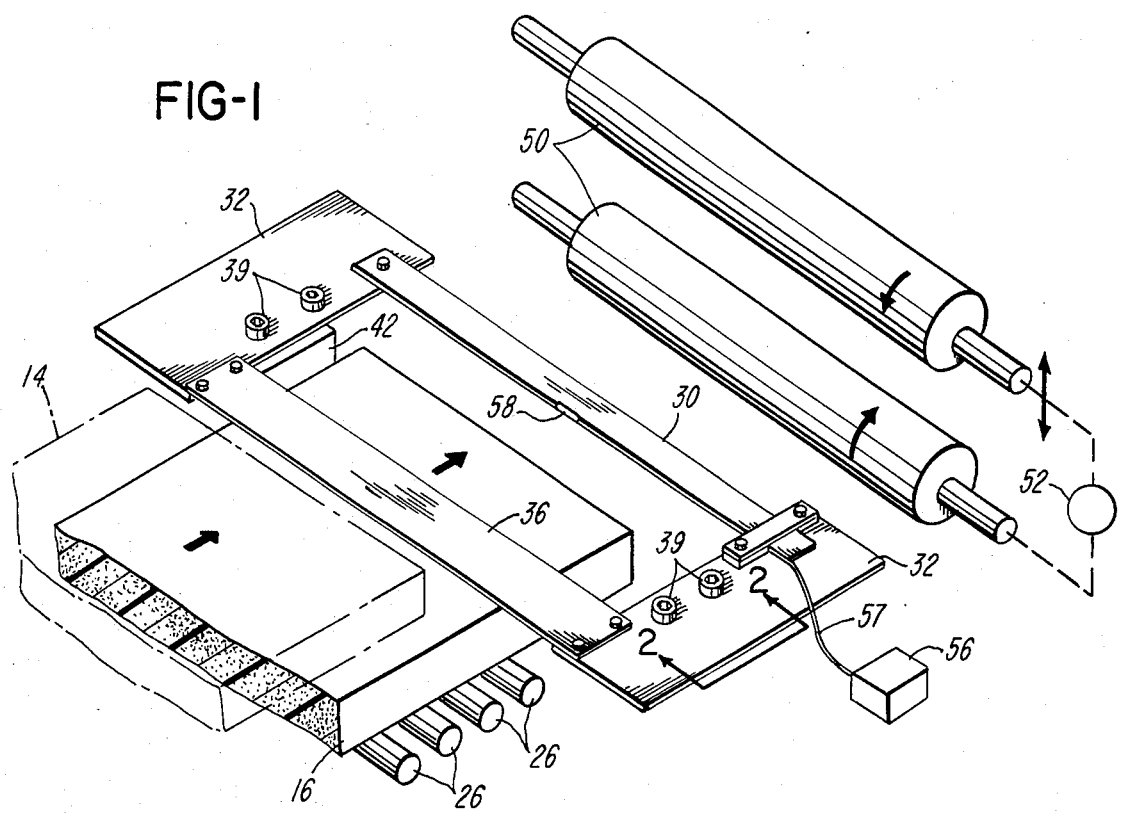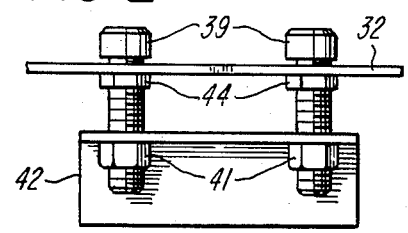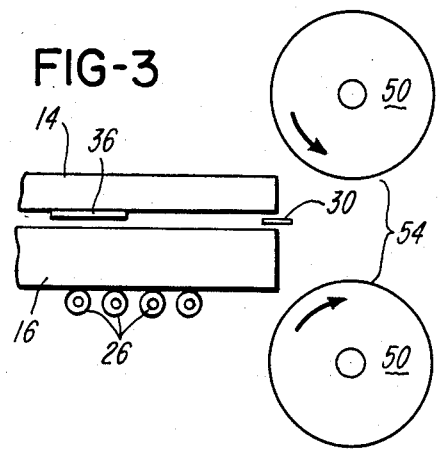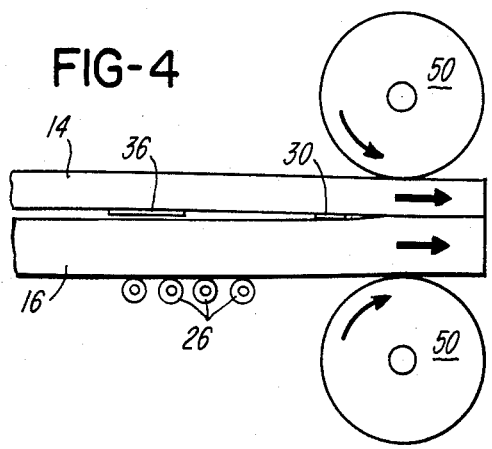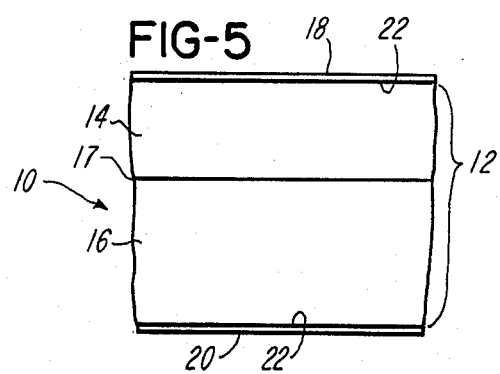

4,608,103

PRODUCTION OF FOAM CORE INSULATING PANELS

BACKGROUND OF THE INVENTION

Insulating foam core panels commonly include a core of expanded rigid foam material, and the core is laminated to facing sheets which may be metal, plastics, wood or paper. The facing sheets add strength to the assembled foam core panel and also protect the foam core from damage by moisture or impact by an object. One method of producing rigid foam core panels is the foam-in-place method wherein liquid plastics compounds are blended with blowing agents within the space or cavity defined between rigid facing sheets held in parallel spaced positions. The foam expands to fill the space and to adhere to the facing sheets while the foam cures to form a rigid core. Another method of producing foam core panels is to laminate the facing sheets by adhesive to opposite sides of preformed rigid foam panels.

It is usually desirable that the foam core material have small fine cells which are generally uniform in size and shape and are uniformally dispersed throughout the foam core with the volume of gases enclosed within the cells being approximately 20 times the volume of the foam plastics material forming the walls of the cells. The smaller the cell size, the better the thermal insulating properties of the rigid foam material. However, a small cell foam is more difficult to produce with the desired uniformity of cell size, shape, wall thickness and dispersement than foam having larger cells. Small cell foam boards are produced by extruding the foam material into a board having a thickness of no greater than three inches. When it is desired to produce foam core panels having a thickness greater than three inches, it is common to use planks of foam material expanded within a mold and having substantially larger cells with lower insulating properties.

SUMMARY OF THE INVENTION

The present invention is directed to an improved method and apparatus for producing foam core insulating panels wherein the foam core has substantial thickness and also has a small cell structure to provide for obtaining the maximum thermal insulating property or value for the foam core panel. The method and apparatus of the invention provide for heat-fusing or thermo-welding the side surfaces of two or more small cell rigid foam boards to provide a strong, reliable and durable thick panel without the use of adhesives and the problems associated with adhesives. The method of the invention is also easily controllable and repeatable and is economical to use.

In general, the above features and advantages are provided in accordance with the invention by producing a rigid foam core assembly from multiple flat rigid foam boards with opposing side faces or surfaces of the boards heat-fused together in a manner which assures a positive and strong connection of the boards. The laminated foam core assembly is then sandwiched between and adhesively attached to rigid skins or facing sheets to form the thick foam core panel. The apparatus of the invention includes means for supporting upper and lower horizontal foam boards in precise vertically spaced relation with respect to an elongated electrical resistance heating element or blade extending horizontally between the opposing side surfaces of the foam boards. The horizontal heating blade is supported for vertical floating movement as the upper and lower foam boards are fed between a pair of pressure rolls driven at a speed correlated with the temperature of the heating blade.

Other features and advantages of the invention will be apparent from the following description, the accompanying drawing and the appended claims.

BRIEF DESCRIPTION OF THE DRAWING

FIG. 1 is a diagramatic perspective view of apparatus constructed in accordance with the invention and used for producing foam core boards in accordance with the invention;

FIG. 2 is a fragmentary elevational view taken generally on the line 2—2 of FIG. 1;

FIG. 3 is a diagramatic elevational view of the apparatus shown in FIG. 1 and illustrating the position of two foam boards before lamination;

FIG. 4 is a diagramatic elevational view similar to FIG. 3 and illustrating two foam core boards being welded or heat-fused; and FIG. 5 is a fragmentary elevational view of a foam core panel having a core of laminated foam panels produced with the apparatus shown in FIGS. 1-4.

DESCRIPTION OF THE PREFERRED EMBODIMENT

FIGS. 1-5 illustrate a method and apparatus for producing foam core panels 10 (FIG. 5) in accordance with the invention and wherein the panel 10 includes a rigid foam core assembly 12 of expanded foam plastics material such as extruded expanded polystyrene or expanded chlorinated polyvinyl chloride having a fine closed cell structure. The core assembly 12 includes a preformed rigid foam board 14 and a preformed rigid foam board 16 which are heat-fused or welded together at an interface 17. The core assembly 12 is sandwiched between a set of skins or facing sheets 18 and 20 which are bonded to the outer surfaces of the core assembly 12 by adhesive coatings or layers 22. Each of the facing sheets 18 and 20 may be metal, or wood or plastic or paper material, such as a fiberglass reinforced plastic sheet, a painted aluminum sheet with stucco embossing or a particle board of pressed wood chips.

FIGS. 1-4 illustrate the apparatus for heat-fusing the foam boards 14 and 16 together at the interface 17. The foam board 16 is fed into the apparatus on a platform defined by a series of rollers 26 which support the board 16 in a horizontal plane. The foam boards 14 and 16 have substantial lengths, for example, from 8 feet to 16 feet and a width from 2 feet to 3 feet. The thicknesses of each board is substantially less than the width of the board, for example, from 2 inches to 3 inches.

The forward end of the bottom or lower board 16 is positioned under an elongated flat stainless steel heating strip or blade 30 (FIG. 3) which extends horizontally across the width of the foam board 16 and has opposite end portions attached to a pair of horizontal support plates 32. The heating blade 30 is electrically insultated from the plates 32 and is heated by connecting opposite ends of the blade to an electrical power source so that the blade forms an electrical resistance. The plates 32 also support a spreader member or bar 36 which is spaced with the heating blade 30 above the support rollers 26 by a distance slightly greater than the thickness of the foam board 16, as shown in FIG. 3.

Referring to FIG. 2, each of the plates 32 is supported by a pair of machine screws 39 which are threaded into corresponding nuts 41 secured to an angle member 42. Another pair of nuts 44 are threaded onto the screws 39 for vertical adjustment and support the corresponding plate 32 so that it may move or float vertically by a predetermined distance according to the position of the nuts 44 below the heads of the screws 39. The vertical spacing of the blade 30 and the bar 36 above the rollers 26 may be adjustably selected according to the thickness of the lower foam board 16, by means of the machine screws 39.

As shown in FIG. 3, the spreader bar 36 forms a support for the upper foam board 14 when the board is inserted into the apparatus and positioned directly above the lower foam board 16 in vertical alignment. The spreader bar 36 is positioned slightly above the level of the heating blade 30 so that the forward end of the upper foam board 14 does not contact the heating blade 30 when the foam board is first positioned within the apparatus directly above the lower foam board 16. A pair of vertically spaced pressure members or rolls 50 are positioned above and below the heating blade 30, as shown in FIG. 3, and are driven in opposite directions by a drive mechanism including a variable speed drive motor 52. The drive system or mechanism for the rolls 50 provides for adjusting the upper rolls 50 in a vertical plane in order to vary the spacing or gap 54 defined between the rolls 50. The speed of the motor 52 is selected according to the desired processing rate, and a controller 56 is connected by conductors 57 to a temperature sensing element or thermocouple 58 recessed within the leading edge of the heating blade 30.

In operation of the apparatus described above in connection with FIGS. 1 and 2 for heat-fusing or welding the lower side surface of the upper foam board 14 to the upper side surface of the lower foam board 16, the rolls 50 are adjusted to define a gap 54 which is slightly less than the combined thicknesses of the foam boards 14 and 16. For example, if the combined thicknesses of the foam boards 14 and 16 is 6 inches, rolls 50 are adjusted to define a gap 54 of approximately 5½ inches to provide a half inch "crush". The heating blade 30 is energized to a predetermined temperature, for example, 500° F. The foam boards 14 and 16 shown in FIG. 3 are then advanced forwardly until the leading ends of the boards enter the gap 54 which causes the opposing side surfaces of the foam boards 14 and 16 to contact the upper and lower sides of the heating blade 30. The temperature of the blade 30 is selected to soften the skin or surface portions of the foam boards after which the softened surfaces are pressed together by the rolls 50, as shown in FIG. 4.

As the driven rolls 50 feed the foam boards 14 and 16 through the gap 54, the opposing side surfaces of the boards are uniformally heated by the blade 30 along the full length of the boards 14 and 16 and are then fused together to form the interface 17. Since the thickness of each foam board 14 and 16 varies somewhat along its length, for example, by plus or minus 1/16 inch, the heating element or blade 30 is permitted to shift or float vertically as a result of the movement of the support plates 32 on the screws 39. Thus a uniform pressure contact is made against the heating blade 30 by each of the foam boards 14 and 16. This provides for a uniform and dependable weld at the interface 17 by assuring uniform heating and softening of the opposing side surfaces of the foam boards. As mentioned above, the temperature of the blade 30 is monitored by the sensor 58, and the blade is maintained at a constant temperature by the controller 56. The selected temperature of the heated blade, the speed of the rolls 50 and the spacing between the rolls 50 may be independently adjusted to obtain the optimum weld of the foam board 14 to the foam board 16.

After the foam boards 14 and 16 are welded together to form the core assembly 12, the core assembly is fed through a planer which planes and smoothes the outer surfaces of the core assembly 12. The coatings 22 of adhesive are then applied by roll coating or spray to the outer surfaces of the core assembly, and the facing sheets 18 and 20 are attached to the core assembly 12 by the adhesive to form the rigid foam core panel 10. The outer edges of the foam core panel 10 are then machined or trimmed by finishing machinery to provide the desired width and length dimensions for the foam core panel.

From the drawing in the above description, it is apparent that the method and apparatus of the invention provide for economically and efficiently producing a foam core panel 10 having a core assembly 12 of fine closed cells of uniform size. As a result, the invention provides for a foam core panel having substantial thickness and a maximum thermal insulating property. The heat-fused or welded interface 17 also provides for a positive and durable integral connection of the foam panels 14 and 16 with the shear and tensile strength of the weld being greater than the shear and tensile strength of the foam material.

While the form of apparatus and method herein described constitutes a preferred embodiment of the invention, it is to be understood that the invention is not limited to this precise form of apparatus and method, and that changes may be made therein without departing from the scope and spirit of the invention as defined in the appended claims.

The invention having thus been described, the following is claimed:

1. A method of producing a foam core insulating panel having a length substantially greater than its width and a width substantially greater than its thickness, comprising the steps of supporting two flat rigid foam boards in vertically spaced superposed horizontal relation with opposing inner side surfaces defining a space therebetween, positioning an elongated generally flat heating blade horizontally within the space defined between the opposing inner side surfaces of corresponding leading end portions of the foam boards and laterally across the width of the foam boards in spaced relation to each of the side surfaces, positioning a set of power driven horizontal pressure rolls above and below the heating blade and adjacent the vertically spaced end portions of the foam boards with the rolls spaced vertically to define a gap slightly less than the combined thicknesses of the foam boards, feeding the leading end portions of the foam boards horizontally into the gap, pressing the opposing inner side surfaces of the foam boards with the pressure rolls into contact with opposite sides of the heating blade to soften the side surfaces, continuing the feeding of the foam boards between the driven pressure rolls for pressing the heated and softened opposing inner side surfaces together and to obtain heat-fusing of the side surfaces to form one integral foam core panel assembly from the two rigid foam boards, placing the foam core panel assembly between facing sheets of preselected material, and bonding the facing sheets to the opposite outer side surfaces of the foam core panel assembly.

2. A method of producing a foam core insulating panel having a length substantially greater than its width and a width substantially greater than its thickness, comprising the steps of supporting two flat rigid foam boards in vertically spaced superposed horizontal relation with opposing inner side surfaces defining a space therebetween, supporting an elongated generally flat horizontal heating blade for floating vertical movement within the space defined between the opposing inner side surfaces of corresponding leading end portions of the foam boards and laterally across the width of the foam boards in spaced relation to each of the side surfaces, positioning a set of power driven horizontal pressure rolls above and below the heating blade and adjacent the vertically spaced end portions of the foam boards with the rolls spaced vertically to define a gap slightly less than the combined thicknesses of the foam boards, feeding the leading end portions of the foam boards horizontally into the gap, passing the opposing inner side surfaces of the foam boards with the pressure rolls into contact with opposite sides of the heating blade to soften the side surfaces, continuing the feeding of the foam boards between the driven pressure rolls for pressing the heated and softened opposing inner side surfaces together and to obtain heat-fusing of the side surfaces to form one integral foam core panel assembly from the two rigid foam boards, placing the foam core panel assembly between facing sheets of preselected material, and bonding the facing sheets to the opposite outer side surfaces of the foam core panel assembly.

3. A method as defined in claim 1 and including the steps of attaching a temperature sensing element to the heating blade between the opposing inner side surfaces of the foam boards, sensing the temperature of the heating blade with the sensing element while heating the opposing inner side surfaces of the foam boards, and controlling the temperature of the heating blade in response to the temperature sensed to obtain optimum welding of the opposing inner side surfaces of the foam boards.

4. Apparatus for producing a foam core insulating panel having a length substantially greater than its width and a width substantially greater than its thickness, comprising means for supporting two flat rigid foam boards in vertically spaced generally horizontal superposed relation with opposing inner side surfaces, an elongated substantially flat heating blade, means supporting said heating blade in a horizontal position extending laterally across the width of the foam boards and spaced between the opposing inner side surfaces of corresponding leading end portions of the foam boards, a set of horizontal pressure rolls extending parallel to said heating blade and spaced vertically above and below said heating blade in adjacent relation and defining a gap slightly less than the combined thicknesses of the foam boards, means for driving the pressure rolls for pressing the spaced opposing inner side surfaces of the foam boards into contact with opposite sides of the heating blade to soften the side surfaces and for feeding the foam boards horizontally through the gap to obtain heat-fusing of the side surfaces and to form one integral foam core panel assembly, and means for attaching the opposite outer side surfaces of the foam core panel assembly to corresponding facing sheets of preselected material.

5. Apparatus as defined in claim 4 and including means for supporting the heating blade for vertical floating movement between the foam boards to obtain uniform heating and melting of the opposing side surfaces of the foam boards.

6. Apparatus as defined in claim 4 and including means for sensing the temperature of the heating blade between the foam boards while heating the opposing side surfaces of the foam boards, and means for controlling the temperature of the heating blade in response to the temperature sensed to obtain optimum welding of the opposing side surfaces of the foam boards.

7. Apparatus as defined in claim 4 wherein said means for supporting the foam boards include a spreader member extending horizontally between the foam boards and having an upper surface disposed above said heating blade for supporting the upper foam board spaced above said heating blade prior to feeding the foam boards between said pressure rolls.

8. Apparatus as defined in claim 4 wherein said means for supporting the foam boards include at least one roller member for supporting the lower foam board spaced below said heating blade prior to feeding the foam boards between said pressure members.

9. Apparatus as defined in claim 7 and including a set of support members spaced horizontally to receive the foam boards therebetween, said heating blade and said spreader member having corresponding opposite end portions mounted on said support members, and means for adjusting said support members vertically for precisely positioning the foam boards and for accommodating foam boards of different thicknesses.

* * * * *